United States Patent Office 2,782,858
Patented Feb. 26, 1957

2,782,858
WELL CEMENTING MATERIALS AND THEIR APPLICATION

Rufus V. Jones, Bartlesville, Okla., assignor to Phillips Petroleum Company, a corporation of Delaware No Drawing. Application November 24, 1950, Serial No. 197,509

22 Claims. (Cl. 166—31)

This invention relates to well cementing materials. In one embodiment this invention relates to a method for cementing a well which extends into a porous formation. In another embodiment this invention relates to low water-loss cement slurries comprising a hydraulic cement, sufficient water to form a slurry, and an effective amount of an additive for reducing water-loss.

In the art of cementing oil wells and in grouting cracks in masonry structures there is a tendency for the cement slurry to lose water to such an extent that it becomes dehydrated, set, or cracked prematurely. The conventional method of cementing a pipe in a well is to force a cement slurry down the inside of the pipe. The cement emerges from the bottom of the pipe and passes upward in the well around the exterior of the pipe. If the walls of the bore hole are porous and the cement does not contain a water-loss reducing additive, so much water may pass from the cement slurry into the well wall as to cause the slurry to become set or so thickened as to be unpumpable, so that the cement cannot extend up the well outside the pipe to the desired distance. This undesirable dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated. Artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened cement, the gun perforator may not be able to penetrate into the region beyond that in which the shaley impurities are swollen by the water extracted from the slurry. In such cases the oil production rate of the well may be severely reduced by water contamination from the slurry.

In a real deep well, even when the walls of the well are non-porous, it takes such a long time to force the cement down the pipe and up the inside of the well that the setting time, or time of thickening to an unpumpable extent, becomes important. Obviously the cement must be placed before it becomes unpumpable.

I have discovered a method for preventing the filtration of water from cement slurries to the absorbent surrounding formations and the resulting contamination of such formations. I do this by adding to the cement slurry a small amount of a water-soluble chitin derivative.

An object of this invention is to provide an improved cement slurry useful for grouting in general, for cementing the walls of wells, and for cementing pipe in wells. Another object is to provide a well cementing material which will not contaminate the earth formation in bore holes with water to any substantial degree. Another object is to provide a low water-loss cement slurry suitable for use in oil well cementing operations. Another object is to provide a low water-loss cement. Other objects and advantages will be apparent to one skilled in the art upon reading the accompanying specification and claims.

In preparing a cement slurry of my invention the dry ingredients, comprising hydraulic cement, with or without additives for increasing the time of set, the inert filler material, e. g., sand or crushed limestone, and the water-soluble chitin derivative may be mixed together and later mixed with water alternatively. The water-soluble chitin additive material can be mixed separately with hot or cold water, and then added to the dry cement to form the slurry. The mixing of the hydraulic cement with water must, of course, be done promptly before placing the slurry in position.

By hydraulic cement I intend to include all mixtures of lime, silica, and alumina, or of lime and magnesia, silica, and alumina and iron oxide (magnesia, for example, may replace part of the lime, and iron oxide a part of the alumina) as are commonly known as hydraulic cements. Hydraulic cements include hydraulic limes, grappier cements, puzzolan cements, natural cements, and Portland cements. Puzzolan cements include slag cements made from slaked lime and graulated blast furnace slag. Because of its superior strength, Portland cement is preferred among the hydraulic cements. As defined in the art, e. g., see section 37, page 59, of "Hydraulic Cementing Materials in General—Introductory" from "Materials of Construction" by Adleburg P. Mills (1915), John Wiley and Sons, New York, hydraulic cements are recognized as a definite class, and as results of value may be obtained with any member of that class, it is intended to claim all hydraulic cements.

In most oil well cementing and grouting operations it is generally desirable to use neat cement for added strength, but, obviously, it is always possible to add a certain amount of an inert granular filling material or aggregate such as sand, ground limestone, or any of the other well known inert aggregates, as long as the amount added does not reduce the strength of the cement below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical. It is obvious that sufficient water should be added to form a pumpable slurry, and that when the slurry becomes pumpable no further water need be added. One advantage of the low water-loss slurry of the present invention is that it is not necessary to add excess water over the amount needed for making the slurry pumpable. An additional amount as a reserve for expected losses would tend to reduce the strength of the cement.

I have found that the addition of a minor amount of a water-soluble chitin derivative to the cement slurry reduces the rate of water-loss from the cement slurry to any water-absorbent medium with which the slurry is in contact. In a preferred embodiment of my invention, I employ as a water-loss reducing additive chitin sulfate, carboxymethyl chitin or carboxyethyl chitin or a water-soluble salt of one of these materials.

Chitin is a potentially cheap, complex organic material having an animal origin and is found in abundant quantities in the natural occurring shells or exoskeletons of such crustacea as lobsters, shrimps, crabs, wood lice, water fleas, barnacles and the like. The most generally accepted structure for chitin is

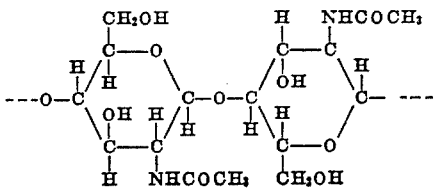

Although the constitution of chitin has not been definitely established, the above structural formula will be considered to be correct for the convenience of this disclosure. The chitin unit will be considered to be an N-acetyl-D-glucosamine, $C_8H_{13}O_5N$ having a unit molecular weight of approximately 203.

To prepare the cement additives of this invention, chitin is reacted to form a substituted chitin which is soluble in water. Such reaction can be accomplished in a number of different water-soluble ways to produce a number of water-soluble chitin derivatives. Chitin sulfate can be prepared by treating chitin with complexes of sulfur trioxide and certain organic compounds such as pyridine, dioxane, N,N-dimethylaniline or beta,beta-dichlorodiethyl ether. These complexes have been recognized in the art as definite compounds, although their exact molecular structure has not been established. The sulfating reaction can be carried out in a solvent comprising pyridine or other tertiary amine such as the picolines, N,N-dimethylaniline and the quinolines. Such solvent has the property of forming complexes or compounds with any acidic substances which might form in the reaction zone.

Either during or after the sulfation reaction a metal ion-yielding material, such as an alkaline earth metal salt or an alkali metal salt is added to obtain the corresponding salts of chitin sulfuric acid. Such metal ion-yielding material can be any water-soluble metal compound which yields metal ions, particularly the alkali metal and group IIA metal salts and hydroxides such as sodium chloride, sodium bromide, sodium hydroxide, and their potassium and lithium analogues. Other representative ion-yielding materials are calcium, barium and magnesium chloride, ferric chloride, sodium oxalate, copper acetate and silver nitrate. Also, ammonium salts or hydroxide can be employed to produce the ammonium salt of chitin sulfate. The ion-yielding material can be included in the charge to the sulfating reaction or it can be added during the sulfating reaction, or to the reaction product either before or after the washing step.

The sulfation reaction is preferably effected under substantially anhydrous conditions. An auxiliary inert diluent can also be used when desired. Such diluent can comprise benzene, chlorohexane, hexane or other such hydrocarbon and admixtures thereof. A temperature within the range of 40 to 115° C. should be maintained during the sulfating reaction.

The sulfation product is preferably washed with benzene or other hydrocarbon to remove any excess amine and then again washed with an alcohol such as methanol or ethanol to remove excess sulfating agent. Such sulfating reaction and the products obtainable therefrom are more fully disclosed and claimed in my copending application, Serial No. 170,057, filed June 23, 1950, now Patent No. 2,689,244, September 14, 1954.

Another water-soluble substituted chitin which can be employed as a cement additive in accordance with this invention is carboxymethyl chitin. Carboxymethyl chitin can be prepared by first treating chitin with a strong, that is, from 20 to 60 weight percent, preferably from 30 to 50 weight percent, aqueous solution of sodium or potassium hydroxide for a period of about two hours at an elevated temperature, for example, one within the range of 60 to 180° F. The resulting alkali chitin can be pressed free from excess caustic and then boiled in water for a short period of time, say, fifteen minutes, and allowed to cool to room temperature. The alkali chitin can then be pressed free from water, dried and shredded. The resulting product is treated with monochloroacetic acid at a temperature within the range of about 20 to 40° F. The amount of monochloroacetic acid employed will depend upon the desired degree of substitution in the carboxymethyl chitin product. Ordinarily, an amount of chloroacetic acid within the range of 0.5 to 3, preferably 1.5 to 2.5 parts by weight per part by weight of alkali chitin to be treated will be satisfactory. The reaction time can be varied in accordance with the reaction temperature and with the chloroacetic acid concentration to control the number of carboxymethyl groups introduced into the chitin molecules. A reaction time of from 30 minutes to 10 hours, preferably from 1 to 5 hours, will be satisfactory. The alkali metal, namely sodium, potassium or lithium, salts or the resulting carboxymethyl chitin can be formed by adding to the reaction product, while in solution, a suitable alkali metal ion-yielding material. This can be an alkali metal salt or hydroxide such as sodium hydroxide, lithium hydroxide, potassium hydroxide or the like. An analogous ammonium hydroxide or salt can also be employed to obtain the corresponding ammonium carboxymethyl chitin. The final product can be washed with distilled water to remove any unreacted monochloroacetic acid and/or excess ion-yielding material.

Still another water-soluble substituted chitin which can be employed as a cement additive in accordance with this invention is carboxyethyl chitin. Alkali chitin can be prepared as above and then dissolved in cold water (25 to 35° F.) to form a viscous solution thereof. Acrylonitrile is added to the solution in an amount within the range of 0.5 to 3, preferably from 0.8 to 2, parts by weight per part of alkali chitin. The exact amount of acrylonitrile employed will be determined by the specific reaction temperature employed, the reaction time and the degree of substitution desired for the carboxyethyl chitin product. The reaction with acrylonitrile can be effected at a temperature within the range of 20 to 120° F. although a temperature within the range of 20 to 80° F. is usually preferred. A reaction time within the range of 0.5 to 10 hours is usually required depending upon the temperature employed and the degree of substitution desired. When the reaction is effected at a relatively low temperature within the above specified ranges, e. g., 20 to 50° F., cyanoethylchitin ether precipitates from solution substantially as it is formed and can be recovered therefrom by filtration before any appreciable hydrolysis occurs. When the precipitated cyanoethylchitin ether is permitted to remain in the reaction mixture, it will hydrolyze to the alkali metal carboxyethylchitin ether and redissolve. The alkali metal carboxyethylchitin ether can be recovered by evaporation of the water or preferably by precipitating it with an alcohol such as methanol or ethanol. A water-soluble ionizable alkali metal salt can be added to the reaction mixture to insure that sufficient alkali metal ions will be present to yield the desired alkali metal carboxyethyl chitin. A resulting product can be dried for use in accordance with this invention by heating to a moderately elevated temperature within the range of 90 to 150° F., preferably under a sub-atmospheric pressure.

The intermediate product, namely cyanoethylchitin ether, can be recovered by filtration before any appreciable hydrolysis occurs and then washed with water to remove water-soluble impurities. It can then be redispersed in an acidic or an alkaline solution and hydrolyzed at room temperature to the carboxyethylchitin ether. Further, alkali metal carboxyethylchitin ether can be produced by hydrolyzing cyanoethylchitin ether in the presence of the corresponding alkali metal hydroxide or other salts thereof. Examples of such alkali metal hydroxides and salts are sodium, potassium and lithium hydroxide, chloride, bromide, nitrate and sulfate. Further, ammonium salts or hydroxide can be used. This procedure is preferred when it is desired to produce very pure products.

The group IB, IIB, IV, V, VI, VII and VIII metal salts of carboxyethyl chitin can be prepared by adding a water-soluble salt of one of these metals to an aqueous solution of acid carboxyethylchitin ether and precipitating the product by the addition of alcohol, acetone, or a similar non-polar liquid. Or, such water-soluble salts can be added during the course of the acrylonitrile-alkali chitin reaction to form the corresponding metal salts in situ.

Examples of these water-soluble salts include mercuric nitrate, maganous nitrate, stannous chloride, cadmium nitrate, bismuth nitrate, cobaltous chloride, antimonious chloride, nickelous sulfate, plumbous nitrate, ferric chloride, cuprous sulfate and chromic sulfate. Such salts of carboxyethyl chitin as are water-soluble can be employed as cement additives of this invention.

The number of substituent groups introduced into the chitin molecule can be varied and will depend upon the specific reaction conditions employed and upon the substituent group which is to be introduced into the chitin molecule. The average number of substituent groups per chitin unit present in the substituted chitin molecule, as above defined, is expressed as the degree of substitution. In the practice of this invention, when employing a substituted chitin selected from the group consisting of the water-soluble salts of chitin sulfate, carboxymethyl chitin and carboxyethyl chitin, it is desirable that the degree of substitution of sulfate, carboxymethyl or carboxyethyl groups, respectively, be within the range of 0.1 to 2.0, preferably 0.2 to 1.5. As degrees of substitution are difficult to determine, I have found that the degree of substitution rendering the material water-soluble is a sufficient test for its utility. By water-soluble, I mean that it appears to be water-soluble to the eye, as whether it is a true solution or some sort of dispersion is not in question, the prior art referring to such materials as water-soluble. The material is of value to the extent that it is water-soluble, and borderline substances may be used which are only partly or barely water-soluble, but better results are obtained when the material is clearly water-soluble. However, it need not be water-soluble if it is soluble in the cement slurry, and all water-soluble materials of this nature are also soluble in the aqueous cement slurry plus less substituted materials that are not quite water-soluble, as the alkalinity of the cement aids in the solution.

My method is effective in reducing the water-loss from any hydraulic cement such as Portland cement or Starcor, which is a modified type of Portland cement which is a hydraulic cement having a retarded set and which differs from Portland cement in that it contains $2CaO.Fe_2O_3$ instead of $3CaO.Al_2O_3$, and has a high ratio of di-calcium silicate to tri-calcium silicate, whereas Portland cement has a high ratio of tri-calcium silicate to the di-calcium silicate, as described in U. S. Patent No. 2,614,998, of October 21, 1952.

My water-loss reducing agents may be mixed with the cement before the addition of water, they may be added to the slurry at the time of mixing, or they may even be added to the water before the mixing of the cement slurry.

The amount of the water-soluble chitin derivative employed in the cementing material is not critical as even a small amount is effective, although to a correspondingly smaller degree. However, as a general rule, the amount of the water-soluble chitin derivative employed will generally fall within the range of from 0.1 to 3.0 weight percent, based on the dry cement incorporated in the slurry. It will of course be understood by those skilled in the art that the exact amount of the water-soluble chitin derivative additive material employed to yield the desired reduction in water-loss in the cement can be varied from time to time and from well to well in accordance with existing conditions. In order to determine the optimum amount of water-soluble chitin derivative to be incorporated with the slurry in any particular well cementing operation, it is merely necessary to test samples of the slurry containing various amounts of the water-soluble chitin derivative in order to determine the rate of water-loss and to arrive at that amount of additive deemed necessary for use in the specific operation at hand.

The advantages of this invention are illustrated in the following example. The reactants and their proportions and their specific ingredients are presented as being typical and should not be construed to limit the invention unduly.

Carboxymethyl chitin and chitin sulfate were each incorporated with Portland cement and with water to form a slurry, each of which was then tested for water-loss and thickening time. A slurry similar to those containing the chitin derivative additive was similarly tested for comparison. The results of these tests are tabulated as follows:

| Wt. of slurry, lbs./gal. | Additive | Percent of additive in slurry [3] | Thickening time at 180° F. (hrs.) | Water-Loss (mls./mins.) |
|---|---|---|---|---|
| 16.3 | None | 0.0 | 0.8-0.9 | 40-50/0.5 |
| 16.3 | Carboxymethyl chitin [1]. | 0.5 | 0.8 | 12/0.2 |
| 16.3 | ......do [1] | 1.0 |  | 2.5/30 |
| 16.3 | Chitin sulfate.[2] | 1.0 | Set in 1 hr. | 28/30 |

[1] 1.1 degree of substitution.
[2] 0.78 degree of substitution.
[3] Based on weight of dry cement.

As will be evident to those skilled in the art, various modifications can be made or followed, in the light of the foregoing disclosure and discussion, without departing from the spirit or scope of the disclosure or from the scope of the claims.

I claim:

1. A hydraulic cement containing a small proportion sufficient to reduce the water loss properties of said cement when slurried of a substituted chitin selected from at least one of the group consisting of the water-soluble salts of chitin sulfate, carboxymethyl chitin and carboxyethyl chitin.

2. A cement of claim 1 wherein the degree of substitution of each of the said sulfate, carboxymethyl and carboxyethyl in the said chitin to render the said chitin water-soluble is within the range of 0.1 to 2.0.

3. The process of producing a hydraulic cement aqueous slurry having a reduced water-loss to porous formations, which comprises forming an admixture consisting essentially of a hydraulic cement, a small proportion of a water-soluble chitin derivative sufficient to reduce water-loss from said cement aqueous slurry, and sufficient water to produce a resulting fluid slurry.

4. The process of claim 3 wherein said minor proportion is within the limits of 0.1 to 3.0 percent of the weight of said cement.

5. The process of cementing a well which extends into a porous formation, which comprises forming a hydraulic cement aqueous slurry having a reduced water-loss by forming an admixture consisting essentially of a hydraulic cement, a small proportion of a water-soluble chitin derivative sufficient to reduce the water loss properties of said slurry, and sufficient water to produce a resulting fluid slurry, and introducing said resulting slurry into said well in contact with said porous formation.

6. The process of claim 5 wherein said hydraulic cement is a Portland cement, and wherein said minor proportion of water-soluble chitin derivative is from 0.1 to 3.0 percent of the dry weight of said hydraulic cement.

7. The process of claim 6 wherein said chitin derivative is a chitin sulfate.

8. The process of claim 6 wherein said chitin derivative is a carboxymethyl chitin.

9. The process of claim 6 wherein said chitin derivative is an alkali metal salt.

10. The process of claim 9 wherein said chitin is a sodium carboxymethyl chitin.

11. The process of claim 9 wherein said chitin is a sodium chitin sulfate.

12. A hydraulic cement capable of forming a fluid slurry when mixed with water having a reduced water-loss to porous formation consisting essentially of a hydraulic cement and a small proportion of a water-soluble chitin derivative sufficient to reduce the water loss properties of said slurry.

13. A Portland cement capable of forming a fluid slurry when mixed with water having a reduced water-loss to porous formation, said cement consisting essentially of a Portland cement and from about 0.1 to about 3 percent of its dry weight of a water-soluble alkali metal substituted chitin.

14. The cement of claim 13 wherein said substituted chitin is sodium carboxymethyl chitin.

15. The cement of claim 13 wherein said substituted chitin is sodium chitin sulfate.

16. A hydraulic cement slurry having a reduced water-loss to porous formations, consisting essentially of a hydraulic cement, water, and a small proportion sufficient to reduce the water loss properties of said slurry of a water-soluble substituted chitin.

17. The hydraulic cement slurry of claim 16 wherein said derivative is a water-soluble salt of a substituted chitin.

18. A Portland cement slurry having a reduced water-loss to porous formations, consisting essentially of a Portland cement, water, and from 0.1 to 3.0 percent of a water-soluble chitin based on the dry weight of said cement.

19. The Portland cement slurry of claim 18 wherein said derivative is a carboxymethyl chitin.

20. The Portland cement slurry of claim 18 wherein said derivative is a chitin sulfate.

21. The Portland cement slurry of claim 18 wherein said derivative is a carboxyethyl chitin.

22. A hydraulic cement capable of forming a fluid slurry when mixed with water having a reduced water-loss to porous formations, said cement consisting essentially of a hydraulic cement and a small proportion sufficient to reduce the water loss properties of said slurry of carboxymethyl chitin.

References Cited in the file of this patent

UNITED STATES PATENTS

| | | |
|---|---|---|
| 2,215,812 | Kaplan | Sept. 24, 1940 |
| 2,288,556 | Vollmer | June 30, 1942 |
| 2,311,290 | Booth | Feb. 16, 1943 |
| 2,427,683 | Ludwig et al. | Sept. 23, 1947 |
| 2,499,548 | Wagner et al. | Mar. 7, 1950 |
| 2,562,148 | Lea et al. | July 24, 1951 |
| 2,598,675 | Cutforth | June 3, 1952 |
| 2,614,634 | Lea et al. | Oct. 21, 1952 |

FOREIGN PATENTS

| | | |
|---|---|---|
| 391,711 | France | Sept. 3, 1908 |

OTHER REFERENCES

Fieser et al.: "Organic Chemistry," D. C. Heath & Company, Boston (1944), page 377.